(12) United States Patent
Gudim et al.

(10) Patent No.: US 10,371,787 B2
(45) Date of Patent: Aug. 6, 2019

(54) EMITTER GEOLOCATION USING SORTED OBSERVATIONS

(71) Applicant: Raytheon Company, Waltham, MA (US)

(72) Inventors: Eric J. Gudim, Goleta, CA (US); Lee M. Savage, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 275 days.

(21) Appl. No.: 15/406,573

(22) Filed: Jan. 13, 2017

(65) Prior Publication Data

US 2018/0203094 A1 Jul. 19, 2018

(51) Int. Cl.
*G01S 5/04* (2006.01)
*G01S 3/46* (2006.01)

(52) U.S. Cl.
CPC . *G01S 5/04* (2013.01); *G01S 3/46* (2013.01)

(58) Field of Classification Search
CPC . G01S 5/04; G01S 5/06; G01S 5/0242; G01S 5/0273; G01S 5/20; G01S 5/22
See application file for complete search history.

(56) References Cited

U.S. PATENT DOCUMENTS

| | | | | |
|---|---|---|---|---|
| 9,438,454 B1 * | 9/2016 | Su | ............... | H04L 27/0012 |
| 9,864,041 B1 * | 1/2018 | Weaver | ............... | G01S 5/0236 |
| 2006/0262011 A1 * | 11/2006 | Bull | ............... | G01C 11/00 342/357.29 |
| 2007/0159394 A1 * | 7/2007 | Grabbe | ............... | G01S 5/0294 342/451 |
| 2010/0315290 A1 * | 12/2010 | Grabbe | ............... | G01S 5/0205 342/386 |
| 2011/0018769 A1 * | 1/2011 | Misikangas | ............... | G01S 5/0072 342/451 |
| 2014/0062719 A1 * | 3/2014 | Rowitch | ............... | H04Q 9/00 340/870.02 |
| 2014/0232553 A1 * | 8/2014 | Venkatraman | ............... | H04Q 9/00 340/870.07 |
| 2015/0051496 A1 * | 2/2015 | Ouchi | ............... | A61B 5/0059 600/473 |

(Continued)

OTHER PUBLICATIONS

Kutty et al., Kalman filter using quantile based noise estimation for Audio restoration, Institute of Electrical and Electronics Engineers, 2011, pp. 616-620, USA.

(Continued)

*Primary Examiner* — Dominic E Rego (57) ABSTRACT

A receiver operable to determine a geolocation of a radio emitter is disclosed. The receiver can identify a set of observations derived from signals emitted by the radio emitter. The signals can be detected via an antenna associated with the receiver. The receiver can identify an estimated location of the radio emitter. The receiver can calculate a cone angle complement for each observation in the set of observations. The cone angle complement can correspond to an ambiguity level of each observation. The receiver can sort the observations based on corresponding ambiguity levels to produce a set of sorted observations. The receiver can process, using a Kalman filter in the receiver, the set of sorted observations to iteratively refine the estimated location for determination of the geolocation of the radio emitter.

19 Claims, 6 Drawing Sheets

(56) References Cited

U.S. PATENT DOCUMENTS

| | | | |
|---|---|---|---|
| 2016/0033616 A1* | 2/2016 | Sen | H04W 64/00 |
| | | | 455/456.5 |
| 2016/0117688 A1* | 4/2016 | Ghosh | G06Q 30/0201 |
| | | | 705/7.29 |
| 2017/0026798 A1* | 1/2017 | Prevatt | H04W 4/023 |
| 2017/0094454 A1* | 3/2017 | Pon | H04W 24/10 |
| 2017/0205492 A1* | 7/2017 | Jacklin | G01S 5/0273 |

OTHER PUBLICATIONS

Park et al., Dead Reckoning Navigation of a Mobile Robot Using an Indirect Kalman Filter, Institute of Electrical and Electronics Engineers, 1996, pp. 132-138, USA.

Shehata et al., Joint Iterative Detection and Phase Noise Estimation Algorithms Using Kalman Filtering, Institute of Electrical and Electronics Engineers, 2009, pp. 165-168, USA.

Sibley et al., The Iterated Sigma Point Kalman Filter with Applications to Long Range Stereo, Robotics Science and Systems, 2006, 8 pages.

Terejanu, Extended Kalman Filter Tutorial, University of Buffalo Department of Computer Science and Engineering, https://cse.sc.edu/~terejanu/files/tutorialEKF.pdf, Jul. 5, 2006, 7 pages, Buffalo, NY.

Trigo et al., Iterated Extended Kalman Filter With Adaptive State Noise Estimation for Electical Impedance Tomography, Technology Meets Surgery International, 2005, 7 pages, Brazil.

Verlaan, Iterated Kalman Filter Using Ensembles, Delft University of Technology, May 21, 2009, 22 pages, Tannersville, PA.

Welch et al., An Introduction to the Kalman Filter, Department of Computer Science University of North Carolina, Jul. 24, 2006, 16 pages, TR 95-041, Chapel Hill, NC.

Zhang, Iterated Extended Kalman Filter, http://research.microsoft.com/en-us/um/people/INRIA/Publis/Tutorial-Estim/node18.html, 1996, 1 page, United States.

* cited by examiner

EMITTER GEOLOCATION USING SORTED OBSERVATIONS

BACKGROUND

A geolocation of a radio emitter can be determined using frequency difference of arrival (FDOA) measurements. FDOA measurements can be referred to as differential Doppler measurements. When a signal is received by two receivers separated by a fixed distance, the FDOA is a difference in received frequency of the signal between the two receivers. Multiple observations can result in multiple FDOA measurements, which can be used to estimate the geolocation of the radio emitter. The geolocation of the radio emitter can be estimated using knowledge of the observation points' locations and vector velocities and relative Doppler shifts between pairs of locations as observed by a moving platform (e.g., an aircraft).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A receiver onboard a moving platform, such as an aircraft, can use a plurality of observations (or looks) to determine a geolocation of a radio emitter. The radio emitter can be stationary or non-stationary (i.e., mobile). The plurality of observations can be referred to as a block of observations. The receiver can obtain the observations based on signals emitted from the radio emitter. The observations can include frequency difference of arrival (FDOA) and/or time difference of arrival (TDOA) measurements. The FDOA measurements can also be referred to as differential Doppler measurements or rotational Doppler measurements. The observations can occur at periodic intervals (e.g., every one second). Since the receiver can be constantly moving, each observation can be at a different location. The receiver can process the observations, and estimate the geolocation of the radio emitter. In other words, the processing of the observations can converge to a geolocation solution.

However, under certain circumstances, the receiver can experience ambiguities with some of the observations obtained from the radio emitter, and the ambiguities can adversely affect the receiver's performance. More specifically, the receiver can experience ambiguities with some of the FDOA measurements included in the observations. The ambiguities can result due to certain flight or movement characteristics of the moving platform (e.g., sharp maneuvers) on which the receiver resides. When the receiver processes observations with ambiguities, this can lead to divergence from an accurate geolocation solution (as opposed to convergence to a geolocation solution). The ambiguities can result in multiple solutions to the same problem, which can lead to inaccuracies in the estimate of the radio emitter's geolocation.

In one example, the ambiguities can occur during observations (or looks) when a rotational Doppler cone axis is towards a direction of the radio emitter. The rotational Doppler cone axis can be analogous to a differential velocity axis associated with the receiver onboard the moving platform. This positional relationship between the rotational Doppler cone axis and the direction of the radio emitter can be considered a non-linear geometry, which is a "poor" geometry that results in ambiguities.

In accordance with the present technology, the receiver can obtain a block of observations to determine the geolocation of the radio emitter, and the receiver can mitigate the effect of ambiguities in the observations by sorting the observations in accordance with an ambiguity level. More specifically, the receiver can identify a set of observations (or looks) derived from signals emitted by the radio emitter. The observations can include FDOA measurements and TDOA measurements. In other words, each observation can include an FDOA component and a TDOA component. The receiver can identify a seed location associated with the radio emitter. The seed location can indicate an initial estimated geolocation of the radio emitter. The receiver can calculate a cone angle complement for each observation in the set of observations, and the cone angle complement can correspond to an ambiguity level of each observation. The receiver can sort the observations based on corresponding cone angle complements to produce a set of sorted observations. The receiver can process, using a Kalman filter, the set of sorted observations to iteratively refine the seed location to determine the geolocation of the radio emitter.

Figure 1:
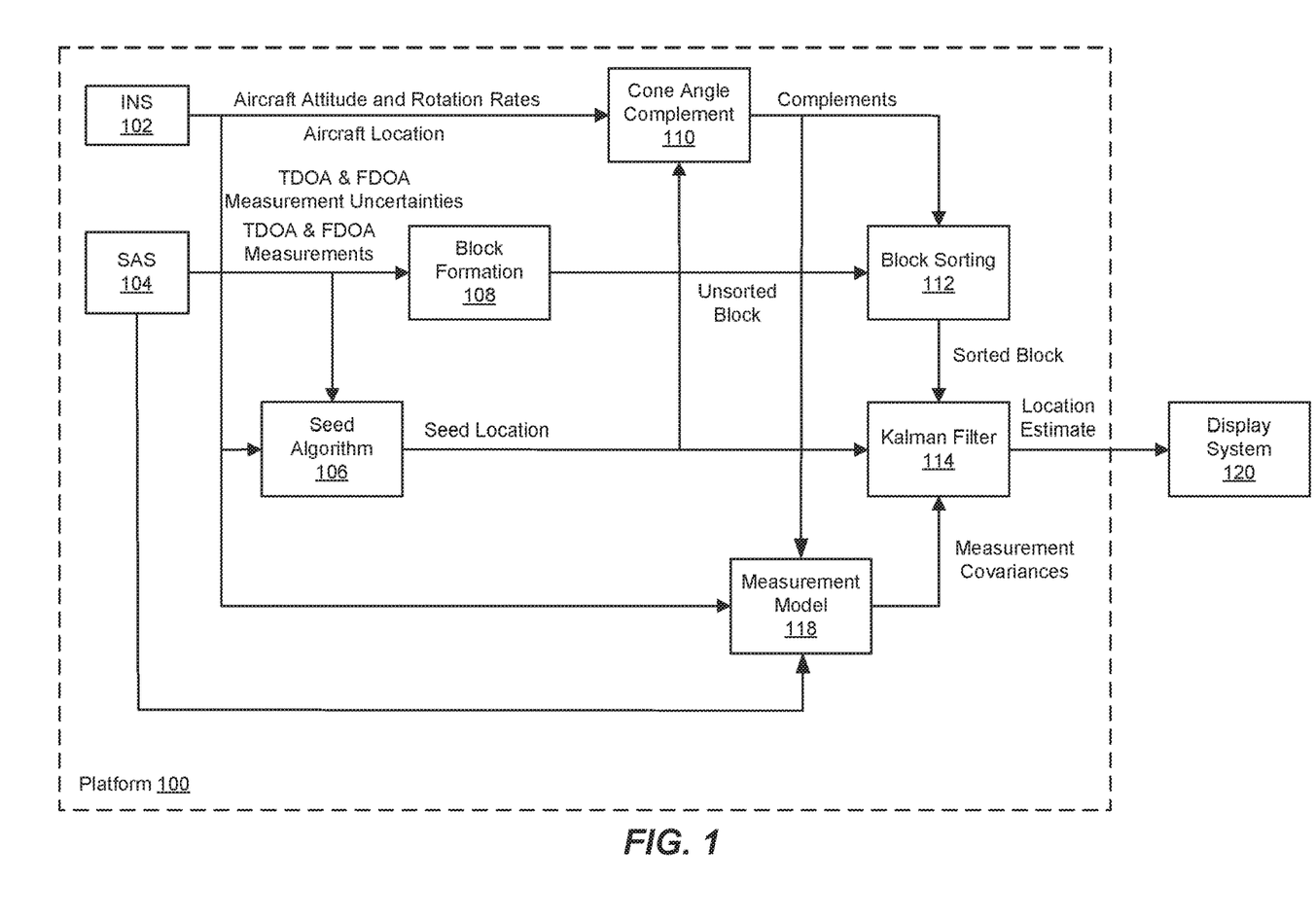
FIG. 1 illustrates a block diagram of a technique for determining a geolocation of a radio emitter in accordance with an example.

FIG. 1 illustrates a block diagram of an exemplary technique for determining a geolocation of a radio emitter. The geolocation of the radio emitter can be determined at a platform 100. The platform 100 can be onboard a moving objet, such as an aircraft or other vehicle. The platform 100 can obtain a block of observations (or looks). The observations can be collected at a defined periodicity over a period of time. The observations can include FDOA measurements and TDOA measurements. The FDOA measurements can also be referred to as differential Doppler measurements or rotational Doppler measurements. The observations (e.g., TDOA and FDOA measurements) are formed by processing raw measurements in the signals analysis subsystem (SAS) 104 associated with the platform 100. The platform 100 can then create a block of observations (by performing block formation 108) using the observations so formed.

The platform 100 can include an inertial navigation system (INS) 102 that provides attitude and rotation information, such as attitude and rotation rates. The INS can include motion sensors (e.g., accelerometers) and rotation sensors (e.g., gyroscopes) that provide information related to the position, orientation and velocity of the platform 100.

The platform 100 can identify a seed location associated with the radio emitter. The platform 100 can identify the seed location using a seed algorithm 106. The seed location can be an initial estimate of the radio emitter's location. Since the seed location is merely an estimate of the radio emitter's location, the seed location can be associated with a certain seed error.

In one example, the platform 100 can calculate a cone angle complement 110, for each observation in the block of observations. More specifically, the platform 100 can calculate a direction of a cross product ($\omega \times B$) for each differential Doppler measurement, wherein $\omega$ is an angular velocity vector and B is a baseline vector. The angular velocity vector and the baseline vector can be calculated using the attitude and rotation information obtained at the INS 102. In other words, the platform 100 can calculate the cone angle complement 110 using an aircraft attitude, aircraft rotation rates and an aircraft location obtained from the INS 102. The direction of the cross product ($\omega \times B$) can be along a rotational Doppler cone axis. The platform 100 can calculate the cone angle complement 110 corresponding to each observation based on an angle between the line of sight to the seed location and a plane orthogonal to the cone axis (i.e., $|90°-\theta_{HC}|$), where $\theta_{HC}$ is the half cone angle measured between the rotational Doppler cone axis and a line of sight from the platform 100 to the seed location.

In one example, the cone angle complements 110 can range from 0 degrees to 90 degrees, as opposed to a half cone angle which can range from 0 degrees to 180 degrees. A cone angle complement 110 that is close to 0 degrees (i.e., a low angle value) can indicate that the corresponding observation (or look) is associated with a low ambiguity level. In other words, a low value for the cone angle complement 110 (e.g., around 0 degrees) can indicate that a corresponding differential Doppler measurement is relatively ambiguity free. On the other hand, a cone angle complement 110 that is close to 90 degrees (i.e., a high angle value) can indicate that the corresponding observation (or look) is associated with a high ambiguity level. In other words, a high value for the cone angle complement 110 can indicate that a corresponding differential Doppler measurement includes ambiguities. Ambiguities can occur in the observations when the rotational Doppler cone axis is in a direction of the radio emitter, and the ambiguities can lead to an increased error in a geolocation solution for the radio emitter.

As an example, when a first cone angle complement is less than a second cone angle complement, an ambiguity level associated with the first cone angle complement can be less than an ambiguity level associated with the second cone angle complement. Similarly, when the first cone angle complement is greater than the second cone angle complement, the ambiguity level associated with the first cone angle complement can be greater than the ambiguity level associated with the second cone angle complement.

The cone angle complement 110 can be calculated for each observation in the block of observations, and each cone angle complement 110 can be associated with an ambiguity level (e.g., high ambiguity or low ambiguity). Accordingly, each observation can be associated with a particular ambiguity level.

In one example, the block of observations (which includes the differential Doppler measurements) can be sorted based on ambiguity levels to produce a block of sorted observations. This process can be referred to as block sorting 112, which can be performed at the platform 100. For example, the observations can be sorted in accordance with ascending ambiguity levels (as indicated by the cone angle complements). When sorted or rearranged in an ascending manner, observations with lower ambiguity levels (which corresponds to low cone angle complements) can occur before observations with higher ambiguity levels (which corresponds to high cone angle complements).

As a non-limiting example, a first observation can be associated with a first cone angle complement of 40°, a second observation can be associated with a second cone angle complement of 80°, and a third observation can be associated with a third cone angle complement of 10°. Low cone angle complements can indicate low ambiguity levels and high cone angle complements can indicate high ambiguity levels. In this example, based on the cone angle complements, the third observation can have a lowest ambiguity level in relation to the other two observations, the first observation can have a medium ambiguity level (in relation to the other two), and the second observation can have a highest ambiguity level (in relation to the other two). Accordingly, the observations can be sorted or rearranged in the following order based on the ambiguity level from low to high: (1) the third observation, (2) the first observation, and (3) the second observation.

In one example, the set of sorted observations (as produced using block sorting 112) can be provided to a Kalman filter 114. As previously described, the observations provided to the Kalman filter 114 can be out of order since the observations are sorted or rearranged based on their corresponding ambiguity levels. The seed location calculated using the seed algorithm 106 can be provided to the Kalman filter 114.

The Kalman filter 114 can use the block of sorted observations, the seed location and the measurement covariances to determine an estimation of the geolocation of the radio emitter. More specifically, the Kalman filter 114 can start from the seed location and process each observation to iteratively refine the seed location to determine the geolocation of the radio emitter. Based on each iteration at the Kalman filter 114, a seed error associated with the seed location can decrease, and the Kalman filter 114 can converge to a geolocation solution for the radio emitter. The Kalman filter 114 can start from the seed location, and observation by observation (or look by look), determine the radio emitter's geolocation in a computationally efficient and accurate manner even when the block of observations (or looks) contains ambiguities.

In one example, a first pass through the Kalman filter can produce a first estimate of the emitter's geolocation. Each additional pass can start with the solution for the previous pass and produce its estimate of the emitter's geolocation. A last pass, which can correspond to a last look in a sorted block of observations, can produce a final estimate of the emitter's geolocation, which can be provided for display. The seed location can be used to compute the cone angle complement for each look in the block. In addition, the block can be rearranged prior to the first pass through the Kalman filter. The order of the passes can remain fixed as the observations move through the Kalman filter.

By first processing the observations with lower ambiguity levels, the Kalman filter 114 can converge to a geolocation solution, and each additional observation can enable the Kalman filter 114 to iteratively refine the geolocation solution. In this case, observations with higher ambiguity levels are processed later in time at the Kalman filter 114, and therefore, can have a reduced impact on the accuracy of the geolocation solution since the Kalman filter 114 is already close to an accurate solution. On the other hand, when the observations are not sorted based on ambiguity levels, the Kalman filter 114 may initially process observations with high ambiguity levels that cause an initial geolocation solution to be far from accurate, and even though additional observations with lower ambiguity can be processed, the initial divergence from an accurate geolocation solution may be too much to overcome and the geolocation solution may not be accurate.

In previous solutions, the Kalman filter would process observations sequentially. In other words, in previous solutions, the observations would not be sorted based on the ambiguity levels. In previous solutions, the Kalman filter should not reorder the observations because the underlying assumption was that the geometry was always linear (so the ambiguities are low). However, in these previous solutions, when certain conditions of the moving platform would cause the geometry to be nonlinear (e.g., certain aircraft maneuvers), it was possible that the Kalman filter would potentially process observations with high ambiguity before processing observations with low ambiguity, which would cause inaccuracies in the geolocation solution.

In the present case, in one example, the geolocation of the radio emitter can be tracked over a defined period of time using the Kalman filter 114, and the geolocation can be provided for display to a display system 120 (e.g., display monitor).

In one example, the observations (or looks) can be sorted without discarding the observations. Observations with high ambiguity can still provide valuable information (e.g., TDOA information) for calculation of the radio emitter's geolocation, so discarding observations altogether can be disadvantageous. However, by sorting the observations such that observations with increased ambiguity levels are processed later in time, the adverse effect of the increased ambiguity levels can be minimized.

In another example of the present disclosure, rather than sorting the observations (or looks) based on ambiguity levels, observations associated with high ambiguity levels can be de-weighted by increasing measurement sigmas associated with the observations. By increasing the measurement sigma for a particular observation, an FDOA component of the observation can be effectively removed while a TDOA component of the observation can remain intact. The observations that are de-weighted can then be processed by the Kalman filter 114 to determine the geolocation of the radio emitter. In one example, the observation can be de-weighted when the corresponding cone angle complement is above a defined threshold. As a non-limiting example, when the cone angle complement 110 is between 80 degrees and 90 degrees, the corresponding observation can be de-weighted (to effectively remove the FDOA component). Those skilled in the art will recognize that other ranges of degrees of cone angle complements 110 can be used, and that those indicated here are not intended to be limiting in any way. It is also noted that, in some cases, sorting the observations as discussed above can lead to a more accurate geolocation as compared to de-weighting the observations.

In still another example, the platform 100 can identify the block of observations (which includes the FDOA and TDOA measurements), identify the seed location, and determine the geolocation of the radio emitter by processing the block of observations starting from the seed location of the radio emitter. In this configuration, the platform 100 may not use a Kalman filter to process the block of observations. Rather, the platform 100 can use an algorithm that simultaneously solves equations for the observations in the block of observations (as opposed to taking an order through the data as done when using the Kalman filter). Thus, in this example, the block of observations is not sorted since the equations for the observations are solved simultaneously. The platform 100 can process multiple blocks of observations over a period of time to determine the geolocation of the radio emitter. For example, the platform 100 can process a progression of blocks over the period of time, such that the seed location is refined to derive the geolocation of the radio emitter. In addition, the progression of blocks can utilize cone angle complements when determining the geolocation of the radio emitter. For example, in a progression of blocks over the period of time, if a defined percentage of the looks in earlier blocks are associated with high cone angle complements (and therefore, high ambiguity levels), then the platform 100 can keep processing additional blocks.

In the above example, the blocks of observations can all be utilized at once in a simultaneous solution. This solution does have a pass-by-pass refinement but utilizes a plurality of looks instead of a single look solution that is modified by a following look's result (as achieved when using a Kalman filter). In addition, the cone angle complement can provide a useful measure for selecting look sets if the set varies from pass to pass, or in a progressive series of blocks, the cone angle complement can provide a measure of a likely block solution quality.

Figure 2:
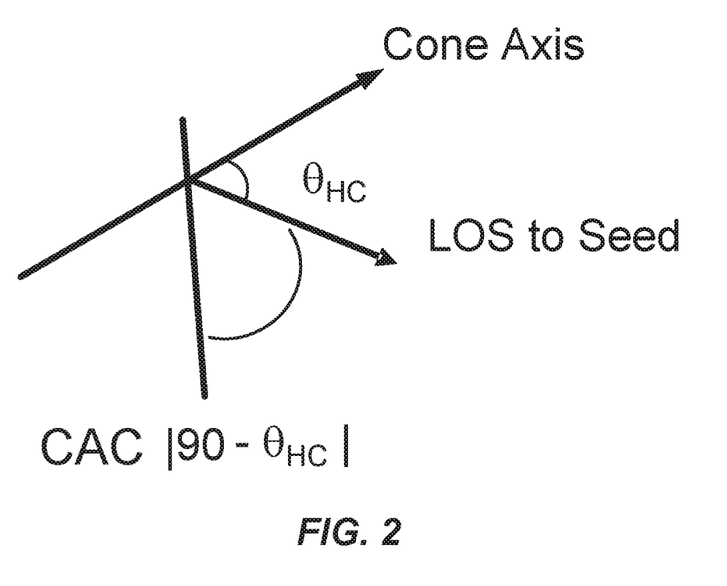
FIG. 2 illustrates a technique for calculating a cone angle complement in accordance with an example.

FIG. 2 illustrates an exemplary technique for calculating a cone angle complement. The cone angle complement can be calculated for each of a plurality of observations (or looks) of a radio emitter, and the observations can include differential Doppler measurements. A receiver onboard an aircraft (or other vehicle or object) can obtain the observations, calculate the cone angle complements for each of the observations, and then determine the geolocation of the radio emitter.

As part of the technique, for a given observation, a direction of a cross product ($\omega \times B$) can be computed, wherein $\omega$ is an angular velocity vector (e.g., of the aircraft) received from an INS and B is a baseline vector. The INS can measure the angular velocity vector ($\omega$) in a suitable manner, and the angular velocity vector can be received via a bus message as three rates for x, y and z dimensions in a body system. The three rates can be rotated to a same coordinate system, such as an aircraft local north east down (NED) coordinate system, as the line of sight to the seed location using the attitude information (e.g., roll, pitch, true heading) sent from the INS in the same bus message. The direction of the cross product (ω×B) can be along a rotational Doppler cone axis. In other words, the rotational Doppler cone axis can be a differential velocity vector and can change according to an attitude or rotation vector, which results in the angular velocity vector. The angular velocity vector can rapidly change depending on the maneuvers performed by the aircraft.

An angle between the rotational Doppler cone axis and a line of sight (LOS) from the receiver to a seed location can further be determined, and this angle can be referred to as a half cone angle ($\theta_{HC}$). The half cone angle can range from 0 degrees to 180 degrees. A complement of the half cone angle can further be calculated, which is referred to as the cone angle complement. The cone angle complement can be calculated according to the following: $|90°-\theta_{HC}|$. The cone angle complement can also be thought of as the angle between the line of sight to the seed location and a plane orthogonal to the cone axis. The cone angle complement can range from 0 degrees to 90 degrees. As discussed above, cone angle complements that are relatively close to 0 degrees can indicate a low ambiguity level and cone angle complements are that relatively close to 90 degrees can indicate a high ambiguity level. The cone angle complement is a scalar value that provides a direct measure of the ambiguity level. The calculation of the cone angle complement can be repeated for each observation (or look) in a block of observations. The observations in the block can be sorted or reordered based on the relative ambiguity levels. For example, the observations can be sorted from low ambiguity to high ambiguity in an ascending order.

In one example, a rotational Doppler equation (f) can be written in scalar form as opposed to a vector form. For example, $f=((\omega B)/lambda) \cos(\theta_{HC})$, wherein lambda represents a measurement frequency and $\theta_{HC}$ represents the half cone angle, and then a derivative can be taken with respect to the cone angle. This can result in $df/d\theta_{HC}=-f0 \sin(\theta_{HC})$, wherein $f0=\omega B/lambda$ is a peak (or valley) FDOA which occurs on the cone axis. The cosine function changes minimally (small derivative) and the cosine function is nonlinear near its peak or minimum. However, near the zero crossing is linear and changes more (strong derivative). The linear nature of the cosine function translates into well behaved isodops in terms of ambiguity. A $\theta_{HC}$ of 90 degrees corresponds to being orthogonal to the cone axis. In addition, an evaluation of $-f0 \sin(\theta_{HC})$ translates to measuring a gradient strength. It may be possible to have a strong gradient and ambiguities, but by changing the order of the processing, an error remaining by the time that look is reached can be less than the seed location, so the effect is minimized.

In terms of the half cone angel $\theta_{HC}$, when this angle between the rotational Doppler cone axis and the line of sight to the seed location is nearly parallel (e.g., approximately 0 degrees) or anti-parallel (e.g., approximately 180 degrees), this results in a high ambiguity level for the corresponding observation (or look). On the other hand, when the angle between the rotational Doppler cone axis and the line of sight to the seed location is near or nearly orthogonal (e.g., a relatively large angle of about 90 degrees), this results in a low ambiguity level for the corresponding observation (or look). In other words, the larger the angle between the cone axis and the line of sight to the seed location the lower the ambiguity.

As described herein, whether the cone angle complement is determined to be "small" or "large" resulting in respective "low" or "high" ambiguity levels is intended to involve a relative comparison between different or other angles and resulting ambiguity levels, such that "low" and "high" and "small" and "large" will mean that quantitative value as measured relative to one or more other angles and associated ambiguity levels. Therefore, a "small" angle is not intended to always and exclusively comprise an angle that is approximately or near 0 degrees, just like a "large" angle is not intended to always and exclusively comprise an angle that is approximately or near 90 degrees. Indeed, a "small" angle could comprise one of 1, 3, 5, 10, 12, 20, 30, etc, degrees if an angle being compared to and sorted with comprises one of a higher degree. In other words, there is no specific range of degrees that define a "small" or "large" angle, but rather these will be determined through comparative analysis of all involved angles.

Figures 3A, 3B:
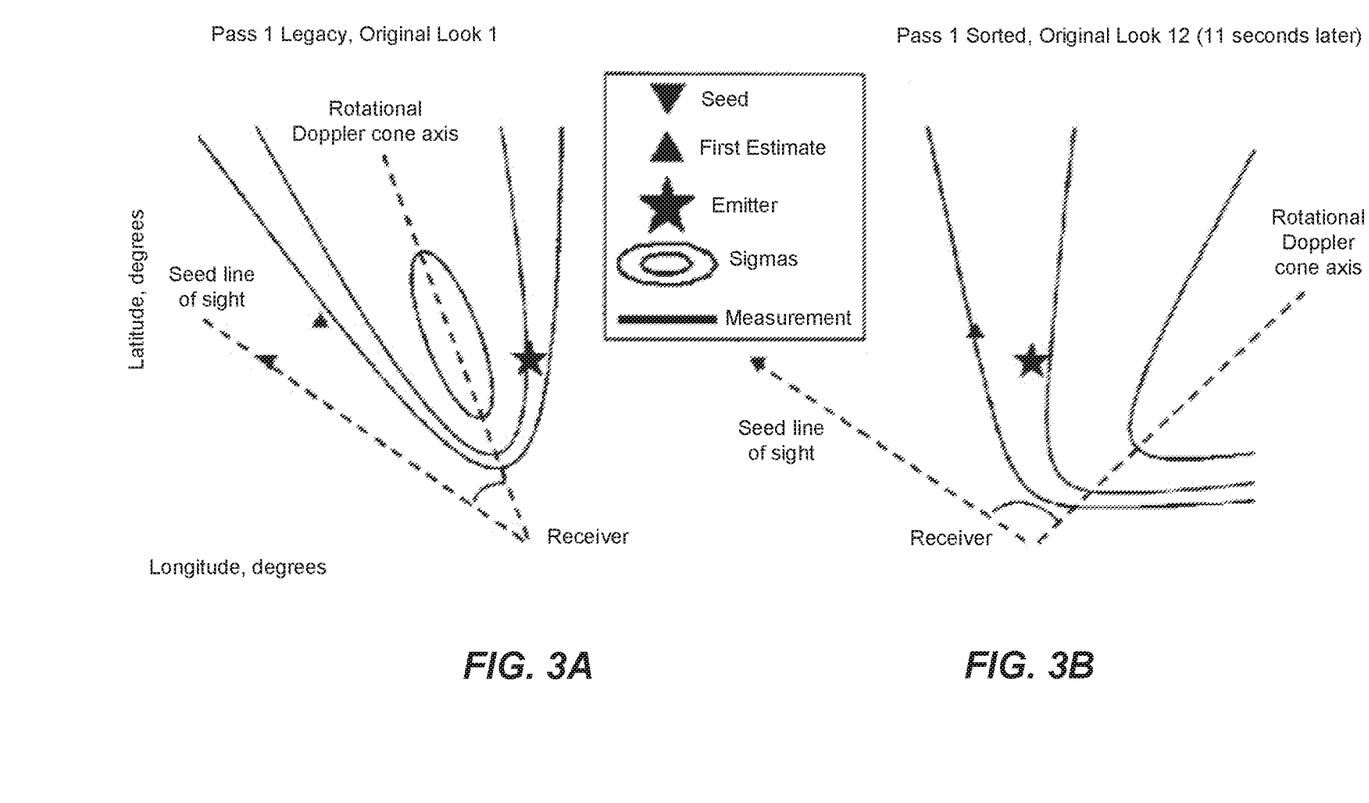
FIGS. 3A and 3B illustrate a magnitude of an angular difference between a rotational Doppler cone axis and a line of sight to a seed location in accordance with an example.

FIGS. 3A and 3B illustrate examples of a magnitude of an angular difference between a rotational Doppler cone axis and a line of sight to a seed location. As shown in FIGS. 3A and 3B, dashed lines can indicate a magnitude of an angular difference between a rotational Doppler cone axis and a scene of interest (or seed line of sight). With a relatively large angular difference, a path from the seed location to the radio emitter can be ambiguity free. The Kalman filter gain can drop in a direction of a strong FDOA gradient after an update, and the reduction in the Kalman filter gain can impede an ability to make future corrections in the direction of the strong FDOA gradient. This is a problem when the Kalman filter is blocked by an ambiguity because it took a small correction when it should have taken a larger correction.

Based on aircraft maneuvers, the rotational Doppler cone axis can strike the Earth in proximity to a true radio emitter location. As a result, a majority of observations (or looks) in a block of observations can be affected by ambiguities. The ambiguity can vary in severity since the exact point of strike can change when a heading of the aircraft changes. The geolocation of the radio emitter can be determined look by look from a starting estimate (i.e., the seed location). As shown in FIG. 3A, which corresponds to the situation in which the observations are not sorted, a strong FDOA gradient can be seen and the Kalman filter can correct to an estimated location of the radio emitter. Since a relatively large step can be taken in the direction of the strong FDOA gradient, a Kalman gain can drop. Even though the Kalman filter can later encounter an observation with less ambiguity, the Kalman filter may be unable to converge to an accurate geolocation solution. As shown in FIG. 3B, which corresponds to the situation in which the observations are sorted based on ambiguity levels, a new first observation (or look) is less ambiguous. The Kalman filter can take a larger step, and the reduction in the Kalman filter gain is now more acceptable since the step was unimpeded. Therefore, sorting the observations by ambiguity levels can result in a more accurate geolocation estimate before the Kalman filters encounters observations with high ambiguities.

In one example, ambiguities (e.g., FDOA ambiguities) can exist when the rotational Doppler cone axis intersects the Earth in the scene of interest (or seed line of sight). The scene of interest can indicate a fairly small region about a seed location that represents a reasonable seed error (e.g., a few tens of degrees). The occurrence of ambiguities can be a function of the seed error. In contrast, when the rotational Doppler cone axis is orthogonal to the seed line of sight, there can be no ambiguities in the scene of interest.

In one example, aircraft maneuvers that yield the strongest gradient in FDOA (i.e., maneuvers that yield a strongest convergence), have observations (or looks) characterized by relatively small ambiguity levels. By flying the aircraft with ideal aircraft maneuvers, the probability of convergence to an accurate geolocation solution are high. However, when the aircraft is flowing with sub-optimal maneuvers, the probably of convergence can decrease.

Figure 4:
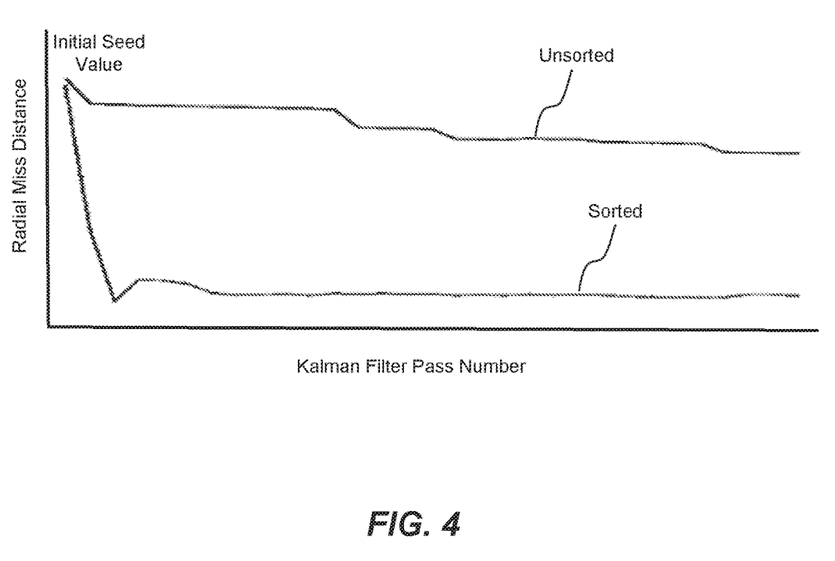
FIG. 4 illustrates a Kalman filter's estimation performance with time under sorted and not sorted hypotheses in accordance with an example.

FIG. 4 illustrates an exemplary the Kalman filter's estimation performance with time under sorted and not sorted hypotheses. A geolocation solution for a radio emitter can start with an initial seed value, and based on each Kalman filter iteration, a radial miss distance can converge to an accurate geolocation solution. When the observations are unsorted, the radial miss distance can decrease over the number of iterations, but the radial miss distance remains relatively large. In other words, when the observations are unsorted, the geolocation solution is relatively inaccurate. On the other hand, when the observations are sorted, the radial miss distance can decrease over the number of iterations, which can result in a more accurate geolocation solution. In both cases, the solution can start at the initial seed value and, after each Kalman filter pass, can reach closer to a final estimate of the miss distance. The sorted block can achieve a majority of its error reduction in the first few looks, whereas the unsorted block, which can be hampered by ambiguities, may not result in a determination of the true location. Therefore, an accuracy of the geolocation solution can be greater when the observations are sorted as opposed to unsorted.

Figure 5:
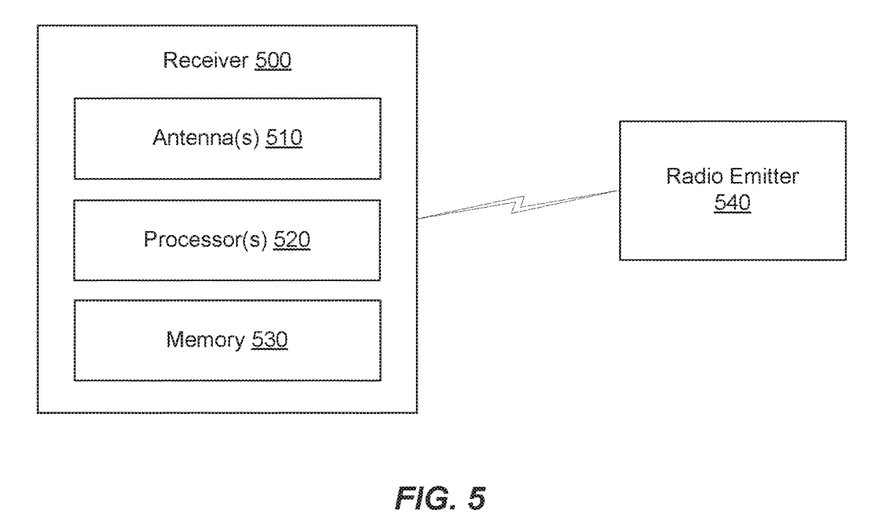
FIG. 5 depicts functionality of a receiver operable to determine a geolocation of a radio emitter in accordance with an example.

FIG. 5 depicts functionality of a receiver 500 operable to determine a geolocation of a radio emitter 540. The receiver 500 can comprise an antenna 510 configured to detect signals emitted by the radio emitter 540. The receiver 500 can comprise one or more processors 520 and memory 530 configured to identify a set of observations derived from the signals emitted by the radio emitter 540. The one or more processors 520 and memory 530 may also be configured to identify an estimated location of the radio emitter 540. The one or more processors 520 and memory 530 may further be configured to calculate a sortable quantity for each observation in the set of observations, wherein the sortable quantity is used to determine an ambiguity level of each observation. Moreover, the one or more processors 520 and memory 530 may be configured to sort the observations based on corresponding ambiguity levels to produce a set of sorted observations. The one or more processors 520 and memory 530 may also be configured to process the set of sorted observations to iteratively refine the estimated location for determination of the geolocation of the radio emitter 540. For example, the set of sorted observations can be processed using a Kalman filter in the receiver 500.

In one example, the one or more processors 520 and memory 530 may be configured to track the geolocation of the radio emitter 540 over a defined period of time, and to provide the geolocation for display to a display system.

In one example, the one or more processors 520 and memory 530 may be configured to calculate a direction of a cross product ($\omega \times B$) for each observation, wherein $\omega$ is an angular velocity vector and B is a baseline vector, and wherein the direction of the cross product ($\omega \times B$) is along a rotational Doppler cone axis. Moreover, in various embodiments, the one or more processors may be configured to calculate the sortable quantity for each observation, wherein the sortable quantity is a cone angle complement which indicates an angle between the rotational Doppler cone axis and a line of sight from the receiver to the estimated location of the radio emitter 540.

In one example, the one or more processors 520 and memory 530 may be configured to sort the observations in accordance with ascending ambiguity levels, wherein the ascending ambiguity levels correspond to ascending cone angle complements.

In one example, the angular velocity vector and the baseline vector can be calculated using attitude and rotation information obtained at an INS (not shown) coupled to the receiver 500.

In one example, the cone angle complement can range from 0 degrees to 90 degrees.

In one example, observations associated with low ambiguity levels are processed by the Kalman filter prior to observations associated with high ambiguity levels being processed by the Kalman filter in accordance with the set of sorted observations.

In one example, the one or more processors 520 and memory 530 may be configured to sort the observations without discarding observations.

In one example, ambiguities can occur in observations when a rotational Doppler cone axis is in a direction of the radio emitter 540.

In one example, the set of observations include FDOA measurements and TDOA measurements.

In one example, the receiver 500 can be onboard an aircraft, or any other vehicle or object subject to movements or able to move.

Figure 6:
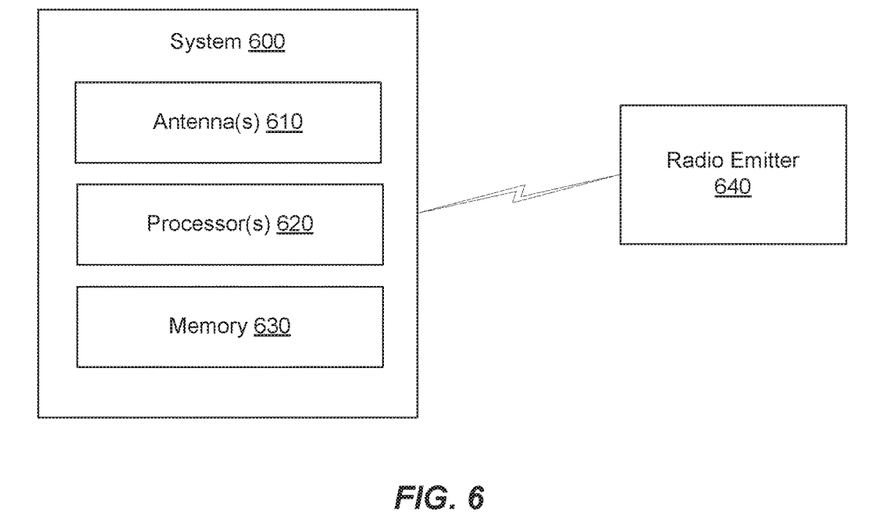
FIG. 6 depicts a system for determining a geolocation of a radio emitter in accordance with an example.

FIG. 6 depicts an exemplary system 600 for determining a geolocation of a radio emitter 640. The system 600 can include one or more antennas 610, one or more processors 620 and memory 630. The system 600 can identify a set of observations derived from signals emitted by the radio emitter 640, wherein the observations are detected via the one or more antennas 610, and wherein the observations include frequency difference of arrival (FDOA) measurements and time difference of arrival (TDOA) measurements. The system 600 can identify a seed location of the radio emitter 640, wherein the seed location indicates an initial estimated geolocation of the radio emitter 640. The system 600 can determine the geolocation of the radio emitter 640 by processing the block of observations starting from the seed location of the radio emitter 640.

In one example, the system 600 can process multiple sets of observations over a period of time to determine the geolocation of the radio emitter 640.

In one example, the system 600 can process observations in the set of observations in a substantially simultaneous manner to determine the geolocation of the radio emitter 640.

In one example, the system 600 can identify a subset of observations that correspond to cone angle complements exceeding a defined threshold. The system 600 can de-weight the subset of observations relative to other observations in the set of observations. The subset of observations can be de-weighted by increasing measurement sigmas associated with the subset of observations.

In one example, the system 600 can calculate a cone angle complement for each observation in the set of observations. The cone angle complement can correspond to an ambiguity level of each observation. The system 600 can sort the observations based on corresponding ambiguity levels to produce a set of sorted observations. The system 600 can process, using a Kalman filter, the set of sorted observations to determine the geolocation of the radio emitter.

In one example, the system 600 can be onboard an aircraft, or any other vehicle or object subject to movements or able to move.

Figure 7:
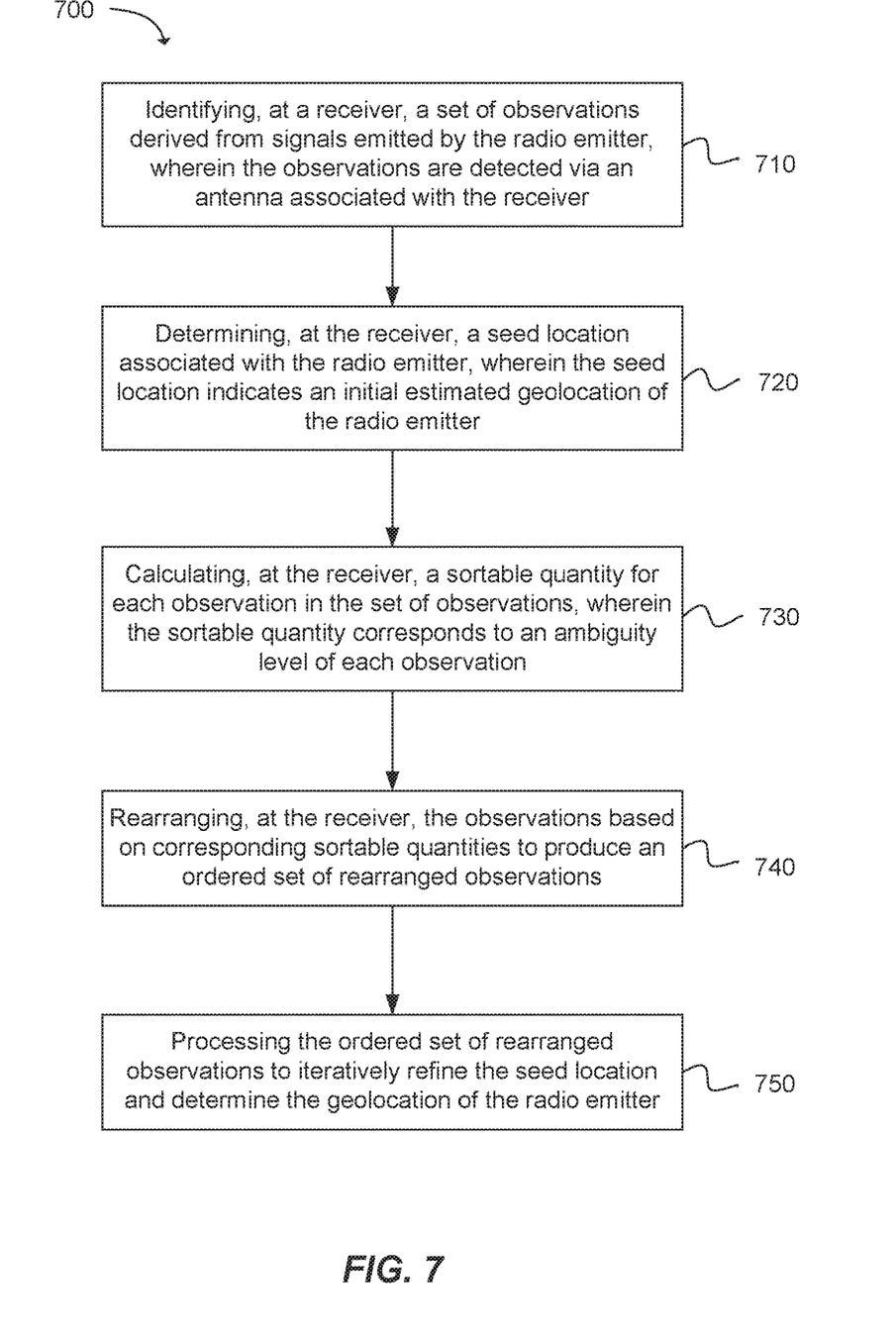
FIG. 7 depicts a flowchart of a machine readable storage medium having instructions embodied thereon for determining a geolocation of a radio emitter in accordance with an example.

FIG. 7 illustrates a flowchart of a machine readable storage medium having instructions embodied thereon for determining a geolocation of a radio emitter. The process of FIG. 7 maybe performed by receiver of FIG. 5 or the system of FIG. 6. The instructions when executed perform the operation of identifying, at a receiver, a set of observations derived from signals emitted by the radio emitter, wherein the observations are detected via an antenna associated with the receiver, as shown in block 710. The instructions when executed perform the operation of determining, at the receiver, a seed location associated with the radio emitter, wherein the seed location indicates an initial estimated geolocation of the radio emitter, as in block 720. The seed location can be determined using a seed algorithm. As an example, the seed location can be determined using effective radiated power (ERP) based range and amplitude monopulse angle of arrival (AOA) techniques. The seed location can be determined using simpler algorithms that are not typically affected by ambiguities. The instructions when executed perform the operation of calculating, at the receiver, a cone angle complement for each observation in the set of observations, wherein the cone angle complement is used to determine an ambiguity level of each observation, as in block 730. The instructions when executed perform the operation of rearranging and/or ordering, at the receiver, the observations based on corresponding cone angle complements to produce an ordered set of rearranged observations, as in block 740. For example, the observations can be sorted or rearranged (based on the cone angle complements) such that observations with low ambiguity levels occur prior to observations with high ambiguity levels. Thus, the cone angle complement can be referred to as a sorted quantity. The instructions when executed perform the operation of processing the ordered set of rearranged observations to iteratively refine the seed location and determine the geolocation of the radio emitter, as in block 750. In one example, the ordered set of rearranged observations can be processed using a Kalman filter in the receiver.

In one example, the instructions when executed perform the operations of calculating a direction of a cross product ($\omega \times B$) for each observation, wherein is an angular velocity vector and B is a baseline vector, and wherein the direction of the cross product ($\omega \times B$) is along a rotational Doppler cone axis. The instructions when executed may also perform the operation of calculating the cone angle complement for each observation, wherein the cone angle complement indicates an angle between the line of sight to the seed location and a plane orthogonal to the cone axis (i.e., $|90°-\theta_{HC}|$), where $\theta_{HC}$ is an angle between the rotational Doppler cone axis and a line of sight from the receiver to the seed location associated with the radio emitter.

In one example, the instructions when executed perform the operation of sorting the observations in accordance with ascending ambiguity levels, wherein the ascending ambiguity levels correspond to ascending cone angle complements.

In one example, the instructions when executed perform the operation of processing observations associated with low ambiguity levels at the Kalman filter prior to processing observations associated with high ambiguity levels in accordance with the ordered set of rearranged observations.

In one example, the set of observations include FDOA measurements and TDOA measurements.

Various techniques, or certain aspects or portions thereof, may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "an example" or "exemplary" or "configuration" means that a particular feature, structure, or characteristic described in connection with the example is included in at least one embodiment of the present disclosure. Thus, appearances of the phrases "in an example" or "in a configuration" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the examples discussed. One skilled in the relevant art will recognize, however, that the examples maybe practiced without one or more of the specific details, or with other methods, components, layouts, etc. In other instances, well-known structures, materials, or operations are not shown or described in detail to avoid obscuring aspects of the disclosure being set forth.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts set forth herein. Accordingly, it is not intended that the invention be limited, except as by the claims set forth below.

What is claimed is:

1. A receiver operable to determine a geolocation of a radio emitter, the receiver comprising:
    an antenna configured to detect signals emitted by the radio emitter; and
    one or more processors and memory configured to:
        identify a set of observations derived from the signals emitted by the radio emitter;
        identify an estimated location of the radio emitter;
        calculate a sortable quantity for each observation in the set of observations, wherein the sortable quantity is used to determine an ambiguity level of each observation;
        sort the observations based on corresponding sortable quantities to produce a set of sorted observations; and
        process the set of sorted observations to iteratively refine the estimated location for determination of the geolocation of the radio emitter.

2. The receiver of claim 1, wherein the one or more processors and memory are configured to:
    track the geolocation of the radio emitter over a defined period of time; and
    provide the geolocation for display to a display system.

3. The receiver of claim 1, wherein the one or more processors and memory are configured to:
    calculate a direction of a cross product ($\omega \times B$) for each observation, wherein $\omega$ is an angular velocity vector and B is a baseline vector, and wherein the direction of the cross product ($\omega \times B$) is along a rotational Doppler cone axis; and
    calculate the sortable quantity for each observation, wherein the sortable quantity is a cone angle complement $|90°-\theta_{HC}|$, wherein $\theta_{HC}$ indicates an angle between the rotational Doppler cone axis and a line of sight from the receiver to the estimated location of the radio emitter.

4. The receiver of claim 3, wherein the one or more processors and memory are configured to sort the observations in accordance with ascending ambiguity levels, wherein the ascending ambiguity levels correspond to ascending cone angle complements.

5. The receiver of claim 3, wherein the angular velocity vector and the baseline vector are calculated using attitude and rotation information obtained at an inertial navigation system (INS) coupled to the receiver.

6. The receiver of claim 3, wherein cone angle complement ranges from 0 degrees to 90 degrees.

7. The receiver of claim 1, wherein observations associated with low ambiguity levels are processed by a Kalman filter prior to observations associated with high ambiguity levels being processed by the Kalman filter in accordance with the set of sorted observations.

8. The receiver of claim 1, wherein the one or more processors and memory are configured to sort the observations without discarding observations.

9. The receiver of claim 1, wherein ambiguities occur in observations when a rotational Doppler cone axis is in a direction of the radio emitter.

10. The receiver of claim 1, wherein the set of observations include frequency difference of arrival (FDOA) measurements and time difference of arrival (TDOA) measurements.

11. A system for determining a geolocation of a radio emitter, the system comprising:
    one or more antennas;
    a processor;
    a memory device including a data store to store a plurality of data and instructions that, when executed by the processor, cause the processor to:
        identify a set of observations derived from signals emitted by the radio emitter, wherein the observations are detected via the one or more antennas, and wherein the observations include frequency difference of arrival (FDOA) measurements and time difference of arrival (TDOA) measurements;
        identify a seed location of the radio emitter, wherein the seed location indicates an initial estimated geolocation of the radio emitter;
        determine the geolocation of the radio emitter by processing the set of observations starting from the seed location of the radio emitter;
        identify a subset of observations that correspond to cone angle complements exceeding a defined threshold; and
        de-weight the subset of observations relative to other observations in the set of observations, wherein the subset of observations are de-weighted by increasing measurement sigmas associated with the subset of observations.

12. The system of claim 11, wherein the plurality of data and instructions, when executed by the processor, cause the processor to process multiple sets of observations over a period of time to determine the geolocation of the radio emitter.

13. The system of claim 11, wherein the plurality of data and instructions, when executed by the processor, cause the processor to process observations in the set of observations in a Substantially simultaneous manner to determine the geolocation of the radio emitter.

14. At least one non-transitory machine readable storage medium having instructions embodied thereon for determining a geolocation of a radio emitter, the instructions when executed by one or more processors perform the following:
    identifying, at a receiver, a set of observations derived from signals emitted by the radio emitter, wherein the observations are detected via an antenna associated with the receiver;
    determining, at the receiver, a seed location associated with the radio emitter, wherein the seed location indicates an initial estimated geolocation of the radio emitter;
    calculating, at the receiver, a sortable quantity for each observation in the set of observations, wherein the sortable quantity determines an ambiguity level of each observation;
    rearranging, at the receiver, the observations based on corresponding sortable quantities to produce an ordered set of rearranged observations; and processing the ordered set of rearranged observations to iteratively refine the seed location and determine the geolocation of the radio emitter.

15. The at least one non-transitory machine readable storage medium of claim 14, further comprising instructions when executed by the one or more processors perform the following:
calculating a direction of a cross product ($\omega \times B$) for each observation, wherein $\omega$ is an angular velocity vector and B is a baseline vector, wherein the direction of the cross product ($\omega \times B$) is along a rotational Doppler cone axis; and
calculating the sortable quantity for each observation, wherein the sortable quantity is a cone angle complement $|90°-\theta_{HC}|$, wherein $\theta_{HC}$ indicates an angle between the rotational Doppler cone axis and a line of sight from the receiver to the seed location associated with the radio emitter.

16. The at least one non-transitory machine readable storage medium of claim 14, further comprising instructions when executed by the one or more processors perform the following: sorting the observations in accordance with ascending ambiguity levels, wherein the ascending ambiguity levels correspond to ascending cone angle complements.

17. The at least one non-transitory machine readable storage medium of claim 14, further comprising instructions when executed by the one or more processors perform the following:
obtaining attitude and rotation information from an inertial navigation system (INS) coupled to the receiver; and
calculating the angular velocity vector and the baseline vector using the attitude and rotation information.

18. The at least one non-transitory machine readable storage medium of claim 14, further comprising instructions when executed by the one or more processors perform the following: processing observations associated with low ambiguity levels at a Kalman filter prior to processing observations associated with high ambiguity levels in accordance with the ordered set of rearranged observations.

19. The at least one non-transitory machine readable storage medium of claim 14, wherein the set of observations include frequency difference of arrival (FDOA) measurements and time difference of arrival (TDOA) measurements.

\* \* \* \* \*